United States Patent
Nam et al.

(10) Patent No.: US 10,381,694 B2
(45) Date of Patent: Aug. 13, 2019

(54) COOLING DEVICE FOR BATTERY CELL AND BATTERY MODULE COMPRISING THE SAME

(71) Applicant: LG CHEM, LTD., Seoul (KR)

(72) Inventors: Jin-Moo Nam, Daejeon (KR); Hyun-Seok Shim, Daejeon (KR); Yong-Seok Choi, Daejeon (KR); Gyu-Jong Bae, Daejeon (KR)

(73) Assignee: LG Chem, Ltd., Seoul (KR)

( * ) Notice: Subject to any disclaimer, the term of this patent is extended or adjusted under 35 U.S.C. 154(b) by 274 days.

(21) Appl. No.: 15/315,637

(22) PCT Filed: Sep. 23, 2015

(86) PCT No.: PCT/KR2015/010030
§ 371 (c)(1),
(2) Date: Dec. 1, 2016

(87) PCT Pub. No.: WO2016/171345
PCT Pub. Date: Oct. 27, 2016

(65) Prior Publication Data
US 2017/0200991 A1  Jul. 13, 2017

(30) Foreign Application Priority Data
Apr. 22, 2015 (KR) .................. 10-2015-0056841

(51) Int. Cl.
*H01M 10/613* (2014.01)
*H01M 10/6552* (2014.01)
(Continued)

(52) U.S. Cl.
CPC ....... *H01M 10/613* (2015.04); *H01M 2/1077* (2013.01); *H01M 10/625* (2015.04);
(Continued)

(58) Field of Classification Search
CPC combination set(s) only.
See application file for complete search history.

(56) References Cited

U.S. PATENT DOCUMENTS

| 9,343,784 B2 | 5/2016 | Wayne et al. |
| 2012/0009455 A1* | 1/2012 | Yoon .................. H01M 10/653 429/120 |

(Continued)

FOREIGN PATENT DOCUMENTS

| FR | 2976739 A3 | 12/2012 |
| JP | 2009-009889 A | 1/2009 |

(Continued)

OTHER PUBLICATIONS

International Search Report and Written Opinion dated Jan. 22, 2016, for Application No. PCT/KR2015/010030.

*Primary Examiner* — Christopher P Domone
(74) *Attorney, Agent, or Firm* — Morgan, Lewis & Bockius LLP

(57) ABSTRACT

According to the present disclosure, there is a cooling device for battery cells including a heat sink with a hollow structure disposed adjacent to at least one side of a battery cell assembly and having a channel formed therein through which a coolant flows, the battery cell assembly including a plurality of battery cells, and a cooling plate configured to carry out heat exchange with the battery cells, the cooling plate including a heat absorbing part interposed between the battery cells such that one surface or both surfaces come into contact with the battery cells, and a heat emitting part extending from the heat absorbing part and exposed to the channel, wherein the heat emitting part includes at least one bent surface arranged parallel to the channel, and at least one through-hole through which the coolant goes.

12 Claims, 11 Drawing Sheets

(51) Int. Cl.
- *H01M 10/647* (2014.01)
- *H01M 10/656* (2014.01)
- *H01M 2/10* (2006.01)
- *H01M 10/625* (2014.01)
- *H01M 10/6555* (2014.01)
- *H01M 10/6556* (2014.01)

(52) U.S. Cl.
CPC ....... *H01M 10/647* (2015.04); *H01M 10/656* (2015.04); *H01M 10/6552* (2015.04); *H01M 10/6555* (2015.04); *H01M 10/6556* (2015.04); *H01M 2220/20* (2013.01)

(56) References Cited

U.S. PATENT DOCUMENTS

| | | |
|---|---|---|
| 2012/0094166 A1 | 4/2012 | Lee et al. |
| 2013/0244066 A1 | 9/2013 | Kang et al. |
| 2013/0288099 A1* | 10/2013 | Kim .................... H01M 2/1077 429/120 |
| 2014/0205875 A1 | 7/2014 | Schmidt |
| 2014/0318746 A1 | 10/2014 | Kwak et al. |
| 2015/0194714 A1 | 7/2015 | You et al. |
| 2016/0204488 A1 | 7/2016 | Arai et al. |

FOREIGN PATENT DOCUMENTS

| | | |
|---|---|---|
| JP | 2012-018915 A | 1/2012 |
| JP | 2014-504779 A | 2/2014 |
| JP | 2015-041418 A | 3/2015 |
| KR | 10-2011-0030225 A | 3/2011 |
| KR | 10-2014-0014413 A | 2/2014 |
| KR | 10-2014-0057717 A | 5/2014 |
| KR | 20-2014-0002634 U | 5/2014 |
| KR | 10-1428383 B1 | 8/2014 |
| KR | 10-2014-0142770 A | 12/2014 |
| WO | 2013/144829 A1 | 10/2013 |

* cited by examiner

COOLING DEVICE FOR BATTERY CELL AND BATTERY MODULE COMPRISING THE SAME

TECHNICAL FIELD

The present disclosure relates to a cooling device for battery cells and a battery module comprising the same, and more particularly, to a cooling device for battery cells that improves cooling efficiency of battery cells and a battery module comprising the same.

The present application claims priority under 35 U.S.C. § 119 to Korean Patent Application No. 10-2015-0056841 filed in the Republic of Korea on Apr. 22, 2015, and under 35 U.S.C. § 365 to PCT/KR2015/010030, filed on Sep. 23, 2015, the disclosures of which are incorporated herein by reference.

BACKGROUND ART

Due to its characteristics of being easily applicable to various products and electrical properties such as a high energy density, a secondary battery is not only commonly applied to a portable device, but universally applied to an electric vehicle (EV) or a hybrid electric vehicle (HEV) and an energy storage system that drive by an electric driving source. This secondary battery is gaining attention for its primary advantage of remarkably reducing the use of fossil fuels and not generating by-products from the use of energy, making it a new eco-friendly and energy efficient source of energy.

A battery pack for use in electric vehicles has a structure consisting of a plurality of cell assemblies connected in series, each cell assembly including a plurality of unit cells, to obtain high power. Also, the unit cell includes a positive electrode current collector and a negative electrode current collector, a separator, an active material, and an electrolyte solution, and allows repeated charging and discharging by electrochemical reactions between the constituent elements.

Recently, with the growing need for a high-capacity structure as well as utilization as an energy storage source, there is an increase in demand for a battery pack with a multi-module structure in which a plurality of battery modules including a plurality of secondary batteries connected in series and/or in parallel are assembled.

Because a battery pack with a multi-module structure is designed to include a plurality of secondary batteries arranged with a high density in a narrow space, it is important to easily emit heat generated from the respective secondary batteries. Because charging and discharging of secondary batteries are accomplished by electrochemical reactions as noted above, unless heat generated during charging and discharging is effectively removed from a battery module, heat accumulation occurs and as a result, degradation of the battery module is accelerated, and in some instances, a fire or explosion may occur.

Accordingly, a high-output high-capacity battery module and a battery pack with the same necessarily need a cooling device to cool down battery cells embedded therein.

Generally, a cooling device is typically classified into two types: an air-cooled cooling type and a water-cooled type, and an air-cooled cooling type is being used more widely than a water-cooled type due to short circuits or a waterproof problem of secondary batteries.

FIG. 1 is a schematic perspective view of a battery module according to a related art.

Because an amount of power produced by one secondary battery cell is not high, a commercially available secondary battery includes a stack of as many secondary battery cells 3 as needed. Also, as shown in FIG. 1, to properly maintain the temperature of the secondary battery by cooling the heat generated during the production of electricity from the unit cells 3 of the secondary battery, cooling fins 2 are inserted between the cells 3. The cooling fin 2 having absorbed heat from each unit cell 3 transmits the heat to a heat sink 1, and the heat sink 1 is cooled by cooling water or cool air. In this instance, a member for reducing thermal contact resistance, such as a thermal interface material (TIM) 4, may be further added between the cooling fin 2 and the heat sink 1.

However, this cooling fin 2 according to the related art has low thermal conductivity due to contact resistance with the heat sink 1, failing to smoothly discharge heat generated from the secondary battery cells.

DISCLOSURE

Technical Problem

The present disclosure is designed to solve the above problem, and therefore, the present disclosure is directed to providing a cooling device for battery cells that may increase the cooling performance of battery cells.

The present disclosure is further directed to providing a battery module comprising the cooling device which has excellent life characteristics and safety by virtue of high cooling performance.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A cooling device for battery cells according to the present disclosure includes a heat sink with a hollow structure disposed adjacent to at least one side of a battery cell assembly and having a channel formed therein through which a coolant flows, the battery cell assembly including a plurality of battery cells; and a cooling plate configured to carry out heat exchange with the battery cells, the cooling plate including a heat absorbing part interposed between the battery cells such that one surface or both surfaces come into contact with the battery cells, and a heat emitting part extending from the heat absorbing part and exposed to the channel, wherein the heat emitting part includes at least one bent surface arranged parallel to the channel, and at least one through-hole through which the coolant goes.

The at least one bent surface may be plural, and the bent surfaces may be arranged apart from each other at a predetermined interval with through-holes placed therebetween.

The plurality of bent surfaces may include a first bent surface formed such that an end part of the cooling plate is bent, and a second bent surface formed in a bent shape parallel to the first bent surface below the first bent surface.

The second bent surface may be formed such that the cooling plate is partially cut and the cut part is bent parallel to the first bent surface, and the through-hole may be defined as a space formed by bending the cut part.

The second bent surface may include a plurality of unit second bent surfaces, and the unit second bent surfaces may be formed at a predetermined interval along a widthwise direction of the cooling plate.

The at least one bent surface may be one, and the bent surface may be formed such that an end part of the cooling plate is bent in a shape of letter "T".

The bent surface may include a first bent surface formed such that an end part of the cooling plate is bent in one direction; and a second bent surface formed such that the cooling plate is partially cut and the cut part is bent in an opposite direction to the first bent surface and parallel to the first bent surface.

The first bent surface and the second bent surface may be provided on the same plane, and the through-hole may be defined as a space formed by bending the cut part.

The second bent surface may include a plurality of unit second bent surfaces, and the unit second bent surfaces may be formed at a predetermined interval along a widthwise direction of the cooling plate.

The cooling plate may be a thermally conductive metal plate.

The coolant may be a gas or a liquid.

According to another embodiment of the present disclosure, there is provided a battery module including the above described cooling device for battery cells.

According to still another embodiment of the present disclosure, there is provided a battery pack including the above described battery module.

According to further another embodiment of the present disclosure, there is provided a vehicle including the above described battery pack. The vehicle may include an electric vehicle, a hybrid electric vehicle, and a plug-in hybrid electric vehicle.

Advantageous Effects

According to one aspect of the present disclosure, a heat emitting part of a cooling plate is arranged inside a heat sink channel and may eliminate the thermal contact resistance between a cooling plate and a heat sink according to a related art. Also, at least one bent surface forming a heat emitting part is arranged parallel to a flow direction of a coolant, thereby increasing a convective heat transfer area and improving cooling efficiency of battery cells.

According to another aspect of the present disclosure, a coolant passes through a through-hole of a heat emitting part, leading to a smooth flow of a coolant and a reduced load on a coolant supplying fan.

According to still another aspect of the present disclosure, there is provided a battery module including the above-mentioned cooling device for battery cells, which has excellent life characteristics and safety by virtue of high cooling performance

BEST MODE FOR CARRYING OUT THE INVENTION

Figure 1:
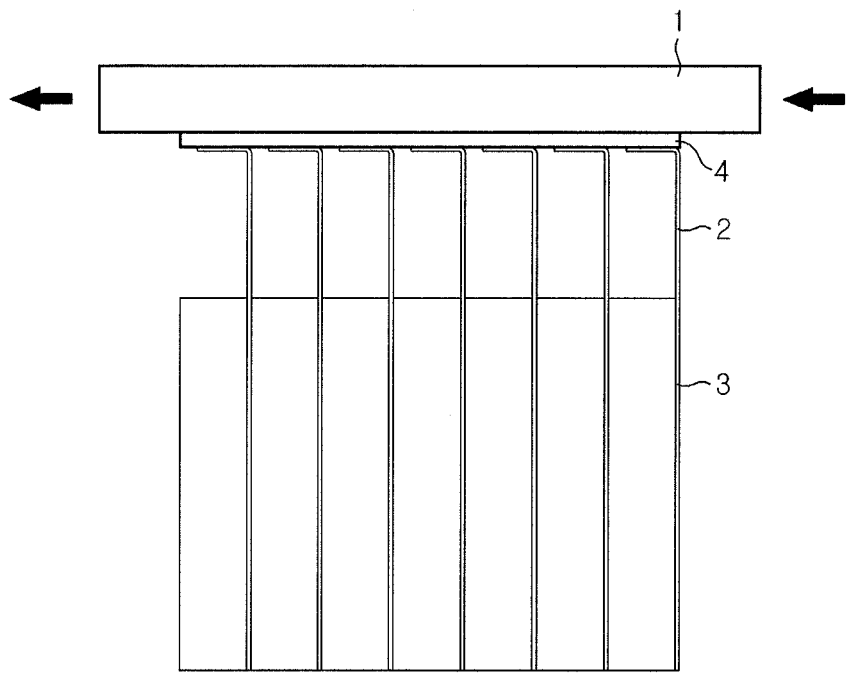
FIG. 1 is a schematic cross-sectional view of a battery module according to a related art.

Hereinafter, preferred embodiments of the present disclosure will be described in detail with reference to the accompanying drawings. Prior to the description, it should be understood that the words or terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the examples described herein and elements in the drawings are just a most preferable example of the present disclosure and do not represent all the technical features of the present disclosure, so it should be understood that a variety of equivalents and modifications to replace them could be made at the filing time of the present disclosure.

Also, in the description of the present disclosure, when it is deemed that certain detailed description of related well-known features or functions may render the essence of the present disclosure indefinite, its detailed description is omitted herein.

The embodiments of the present disclosure are provided to give those skilled in the art a complete description of the present disclosure, and thus, the shape and size of elements in the drawings may be exaggerated or omitted or may be schematically illustrated for clarity. Accordingly, the size or proportion of each element does not reflect the actual size or proportion thoroughly.

Figure 2:
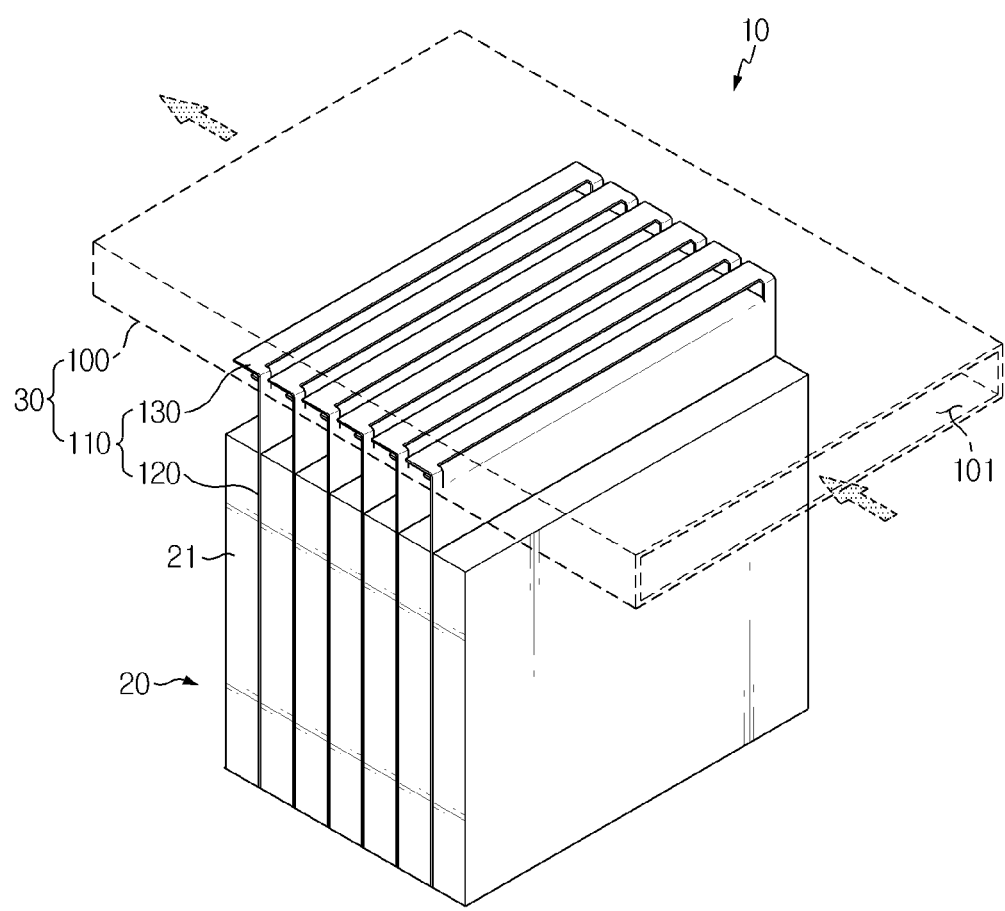
FIG. 2 is a schematic perspective view of a battery module according to a first embodiment of the present disclosure.
Figure 3:
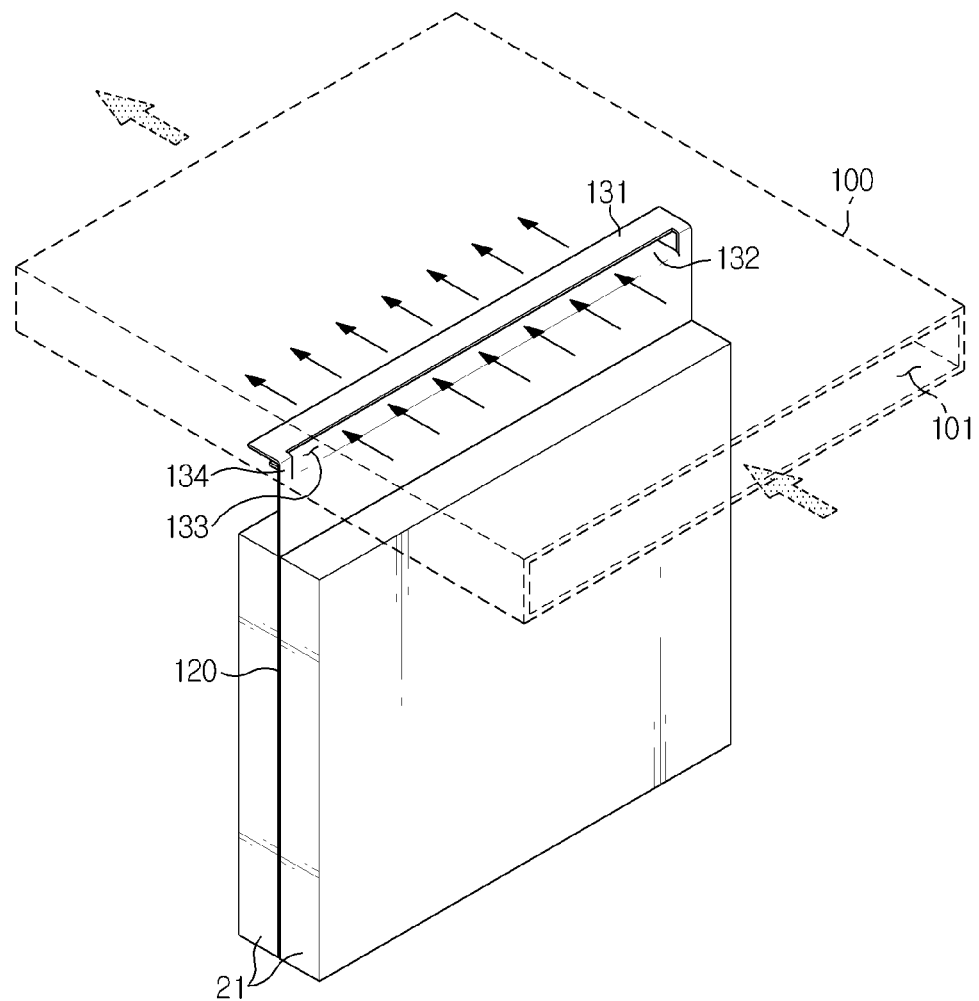
FIG. 3 is a perspective view showing some of battery cells and cooling plates of FIG. 2.
Figure 4:
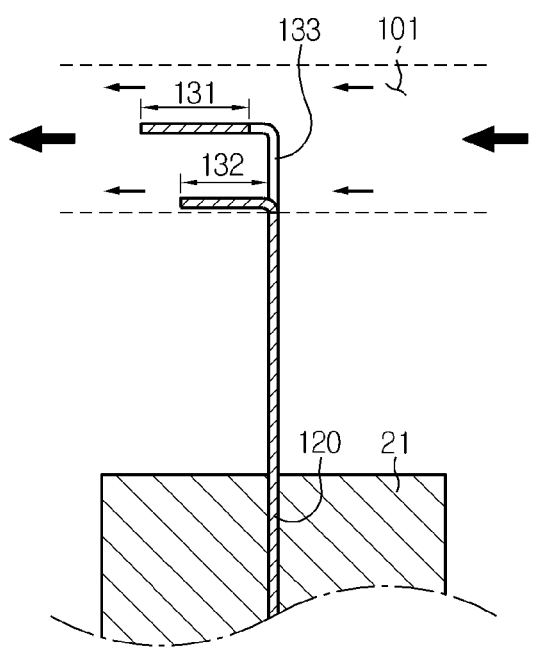
FIG. 4 is a cross-sectional view of FIG. 3.
Figure 5:
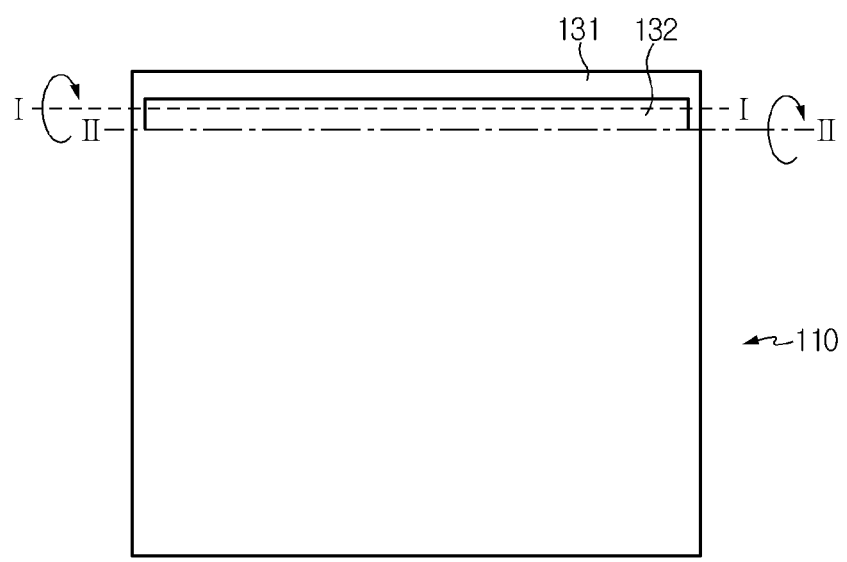
FIG. 5 is a reference diagram for a cooling plate according to a first embodiment of the present disclosure.

FIG. 2 is a schematic perspective view of a battery module according to a first embodiment of the present disclosure, FIG. 3 is a partially enlarged perspective view of FIG. 2, FIG. 4 is a cross-sectional view of FIG. 3, and FIG. 5 is a reference diagram for describing a cooling plate according to a first embodiment of the present disclosure.

Referring to these drawings, the battery module 10 according to a first embodiment of the present disclosure includes a battery cell stack 20 and a battery cell cooling device 30.

The battery cell stack 20 is a stack of battery cells 21. The battery cells 21 are preferably plate-type battery cells 21 to provide a high stack ratio in a limited space, and may be arranged in stacks such that one or both surfaces face adjacent battery cells 21 to form the battery cell stack 20.

Although not shown, the battery cell stack 20 may further include a frame for stack for stacking the battery cells 21. The frame for stack is an element used to stack the battery cells 21, and may hold the battery cells 21 to prevent them from moving, and guide the battery cells 21 to be stacked and assembled together.

The frame for stack (not shown) may be replaced with various terms such as a cartridge, and may be formed in a rectangular ring shape with a hollow center. In this case, the outer periphery of the battery cells 21 may be disposed on the four sides of the frame for stack.

Each battery cell 21 may include an electrode assembly made up of a positive electrode plate, a separator and a negative electrode plate, and may be one including a positive electrode lead and a negative electrode lead each electrically connected to a plurality of positive electrode tabs and negative electrode tabs protruding from the positive electrode plates and the negative electrode plates of the battery cell 21.

Here, the battery cells 21 may be pouch-type battery cells 21. The pouch-type battery cells 21 may have a structure in which an outer packing of a laminate sheet including a resin layer and a metal layer is sealed along an outer peripheral surface by heat fusion with the electrode assembly embedded in the outer packing.

The battery cell cooling device 30 suitably removes heat generating from the battery cells 21 during charging and discharging. Referring to FIGS. 2 and 3, the cooling device 30 for the battery cells 21 includes a heat sink 100 and cooling plates 110.

The heat sink 100 refers to an object that absorbs heat from other object by thermal contact and emits the heat. The heat sink 100 may be disposed on at least one of top and bottom of the battery cell stack 20. For example, the heat sink 100 may be disposed on top of the battery cell stack 20 as shown in FIG. 2. Of course, the heat sink 100 may be disposed on any one of the left side and the right side of the battery cell stack 20 according to the need.

The heat sink 100 according to the present disclosure has a hollow structure including a channel 101 therein. A coolant flowing through the channel 101 inside the heat sink 100 is not limited to a particular type provided that it is a fluid which easily flows through the channel 101 and has good cooling performance, and may be a gas or a liquid.

For example, the coolant may be water which has high latent heat and can maximize the cooling efficiency. However, the coolant is not limited thereto and may include any flowable one, and an antifreezing solution, a gaseous coolant, and air can be used.

As shown in FIG. 2, the cooling plate 110 according to the present disclosure is interposed between the battery cells 21 with each of both surfaces in close contact with the battery cells 21, and its end part is exposed to the channel 101 inside the heat sink 100. Also, the cooling plate 110 may be a thermally conductive metal plate having a thickness of 0.1 to 5.0 mm.

The cooling plate 110 includes predetermined mechanical rigidity characteristics per se, helping to reinforce the poor mechanical rigidity of the outer packaging of the battery cells 21. Also, the cooling plate 110 eliminates the need for an additional member for reinforcing the mechanical rigidity, achieving the compact battery module 10.

For reference, the cooling plate 110 is not limited to a particular thickness or structure provided that it is a thin member having thermal conductivity, and for example, a sheet type plate of a metal material may be preferably used. The metal material may include, but is not limited to, aluminum or aluminum alloys that have high thermal conductivity and is lightweight, among metals. For example, copper, gold, and silver may be available. In addition to metals, ceramic materials such as including aluminum nitride and silicon carbide may be available.

On the other hand, the cooling device 30 according to the present disclosure has a structure capable of increasing the heat transfer rate as compared to a conventional cooling device (see FIG. 1), and its detailed description will be provided below.

The cooling plate 110 according to a first embodiment of the present disclosure may include a heat absorbing part 120 and a heat emitting part 130.

The heat absorbing part 120 is interposed between the battery cells 21 such that the heat absorbing part 120 comes in contact with the battery cells 21 to absorb heat from the battery cells 21 during charging/discharging, and the heat emitting part 130 extends upwards from the heat absorbing part 120 and is exposed to the channel 101 inside the heat sink 100 so that the heat transferred by conduction from the heat emitting part 130 is emitted. For reference, although the cooling plate 110 of this embodiment has the heat emitting part 130 in one direction, the cooling plate may be configured to have the heat emitting part 130 in two directions as opposed to this embodiment. In other words, the heat emitting part 130 may extend in two directions from the heat absorbing part 120, namely, from the heat absorbing part 120 to the top and the bottom of the battery cell stack 20, and two heat sinks 100 may be provided, each one on the top and the bottom of the battery cell stack 20.

By this configuration, during charging/discharging, heat from the battery cells 21 is absorbed by the heat absorbing part 120 and the absorbed heat is transferred to the heat emitting part 130 by conduction. Also, the heat emitting part 130 emits the heat to the heat sink 100. In this instance, the cooling rate of the battery cells 21 may greatly rely on an effective heat emission area between the heat emitting part 130 and the heat sink 100 and a convection effect, and the present disclosure is designed, focusing on a structure for maximizing the heat transfer rate between the heat emitting part 130 and the heat sink 100.

First of all, briefly seeing the structure of the conventional cooling fin (see FIG. 1) and the heat sink 100, the conventional cooling fin is bent at its end part to have a thermal contact area with the heat sink 100. However, heat transfer may be impeded by thermal contact resistance between the end part of the cooling fin and the outer wall of the heat sink 100, i.e., surface roughness. To reduce the thermal contact resistance, the conventional battery module 10 further includes a thermal interface material (TIM), but it cannot completely remove thermal contact resistance.

In contrast, the present disclosure does not cause the thermal contact resistance issue between the cooling plate 110 and the heat sink 100. That is, the present disclosure is free from the thermal contact resistance issue caused by the contact between different objects. The present disclosure employs a heat transfer method using heat convection between a solid and a fluid, not a heat transfer method by the contact between two objects having different temperatures, i.e., heat conduction. Here, convective heat transfer refers to transfer of heat between a fluid and the surface of a solid as a result of relative motion of the fluid to the surface if the fluid and the surface of the solid differ in temperature when the fluid flows on the solid or in the channel 101.

Generally, a convective heat transfer amount is defined as $Q=h*A*(T1-T2)$ in engineering terms. Here, h denotes a convective heat transfer coefficient, A denotes a heat emission area, T1 denotes the surface temperature of a solid, and T2 denotes the temperature of a fluid. Thus, to increase the convective heat transfer, when T1 and T2 are fixed, a first approach is to increase the convective heat transfer coefficient h, and a second approach is to increase the effective heat emission area A.

The convective heat transfer coefficient h is a value experimentally determined based on the geometric shape of the surface, the type of the fluid, characteristics of the fluid, and the velocity of the fluid, and is generally proportional to a fluid flow velocity. Also, the heat emission area A refers to an effective heat emission area of an object, and the larger the effective heat emission area, the greater the heat transfer rate.

Thus, the cooling device 30 according to the present disclosure is configured to have an advantageous structure in the effective heat emission area and the flow velocity of a coolant.

Specifically describing, the heat emitting part 130 according to the first embodiment of the present disclosure includes a plurality of bent surfaces 131 and 132 and a vertical surface 134 perpendicular to the bent surfaces 131 and 132 as shown in FIGS. 2 through 4. The bent surfaces 131 and 132 may have a bent shape at an angle of 90 degrees with respect to the heat emitting part 130 vertically arranged between the battery cells 21 or the vertical surface 134. The bent surfaces 131 and 132 are preferably arranged parallel to the channel 101 inside the heat sink 100. This is to allow a coolant to flow along the surfaces of the bent surfaces 131 and 132 to thereby ensure a sufficient convective heat transfer area.

In this embodiment, the bent surfaces 131 and 132 include a first bent surface 131 and a second bent surface 132. The first bent surface 131 is formed such that the end part of the cooling plate 110 is bent at an angle of 90 degrees, and the second bent surface 132 is formed to have a bent shape in the same direction as the first bent surface 131 parallel to the first bent surface 131 below the first bent surface 131. Also, a though-hole 133 is formed between the first bent surface 131 and the second bent surface 132. For reference, although this embodiment shows two bent surfaces, the number of bent surfaces may be three or more depending on the thickness of the cooling plate 110 and the size of the internal space of the heat sink 100.

As shown in FIGS. 3 and 4, a coolant, for example, cool air flows in the direction of arrows within the channel 101 inside the heat sink 100. Although not shown, the flow of cool air may be accomplished by a cooling fan.

Referring to FIGS. 3 and 4, cool air may absorb heat from the heat emitting part 130 while flowing along the upper and lower surfaces of the first bent surface 131 and the upper surface of the second bent surface 132. For example, if the heat emitting part 130 has the vertical surface 134 alone without the bent surfaces 131 and 132 as opposed to this embodiment, the flow of cool air remains stagnant at the rear side of the vertical surface 134 as compared to the front side of the vertical surface 134 facing the flow of cool air, therefore failing to achieve smooth heat emission. Also, the flow of cool air is blocked by the vertical surface 134, resulting in lower flow velocity. Also, to prevent a reduction in flow velocity of cool air in the channel 101 inside the heat sink 100, load applied to the cooling fan may increase as much.

Also, in the case of the heat emitting part 130 having the vertical surface 134 and a single bent surface where only the end part of the cooling plate 110 is bent, the flow of cool air flows along the upper surface of the single bent surface and the effective heat emission area may increase as compared to the heat emitting part 130 having only the vertical surface 134, but the flow of cool air is still blocked by the vertical surface 134, so air remains stagnant at the lower surface side of the single bent surface and the convective heat transfer efficiency is not high.

In contrast, the heat emitting part 130 according to the first embodiment of the present disclosure has the first bent surface 131 and the second bent surface 132 with the though-hole 133 placed between, so the flow of cool air is not blocked by the vertical surface 134 as described above and goes through the though-hole 133, and thus, cool air flows along the upper and lower surfaces of the first bent surface 131 and the upper surface of the second bent surface 132. Accordingly, the effective heat emission area is wider than the above-mentioned examples, resulting in higher cooling efficiency.

Also, because the area of the vertical surface 134 blocking the flow of cool air is reduced, the flow of cool air goes more smoothly and a reduction in flow velocity of cool air will be impeded. For reference, the convective heat transfer increases with the increasing flow velocity of a fluid flowing along the surface of a solid as described in the foregoing.

Also, if the flow of cool air in the channel 101 inside the heat sink 100 is enhanced, the load applied to the cooling fan is reduced, a low capacity cooling fan can be used and energy efficiency will be higher.

The following is a brief description of a method of manufacturing the cooling plate 110 according to the first embodiment of the present disclosure.

As described in the foregoing, the cooling plate 110 may be made of a sheet type plate of metal. First of all, a part of the flat cooling plate 110 is partially cut as shown in FIG. 5. Subsequently, an end part of the flat cooling plate 110 is bent at an angle of 90 degrees with respect to the line I-I. The bent surface forms the first bent surface 131. Subsequently, the cut part is bent at an angle of 90 degrees in the same direction as the first bent surface 131 with respect to the line II-II. The bent surface forms the second bent surface 132. Also, in this instance, a space formed by bending the cut part becomes the though-hole 133. Thus, the size of the though-hole 133 is equal to the cross sectional area of the second bent surface 132.

By this method, it is possible to omit a process of additionally welding a member or perforating the cooling plate 110 to form the second bent surface 132 and the though-hole 133, so the manufacturing process may be simplified. However, the scope of protection of the present disclosure is not limited to this manufacturing method.

The battery module 10 according to the present disclosure as described in the foregoing scarcely has the thermal contact resistance issue between cooling members a conventional battery module has, and has a structure in which the heat emitting part 130 of the cooling plate 110 can maximize the convective heat transfer rate, resulting in improved cooling efficiency of the battery cells 21 as compared to the related art.

Other embodiments of the present disclosure described below are constructed, corresponding to FIGS. 2 through 5 when compared to the previous embodiment. Like reference numerals indicate like elements, and an overlapping description of like elements is omitted herein.

Figure 6:
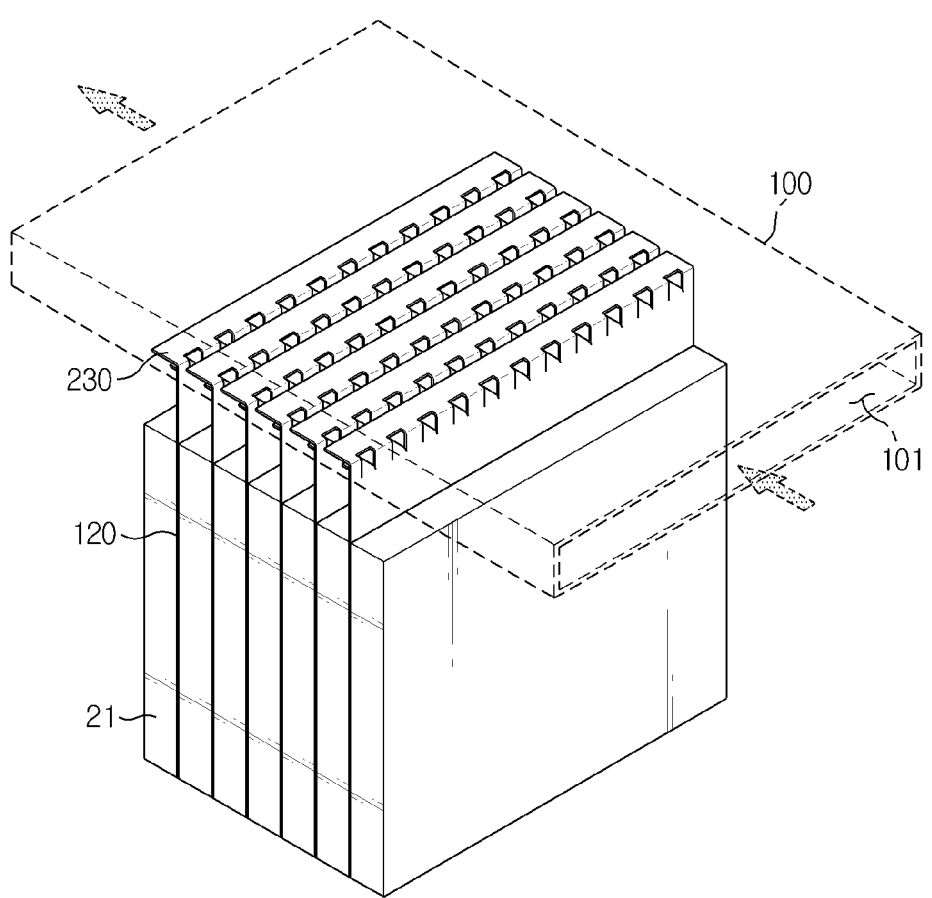
FIG. 6 is a schematic perspective view of a battery module according to a second embodiment of the present disclosure.
Figure 7:
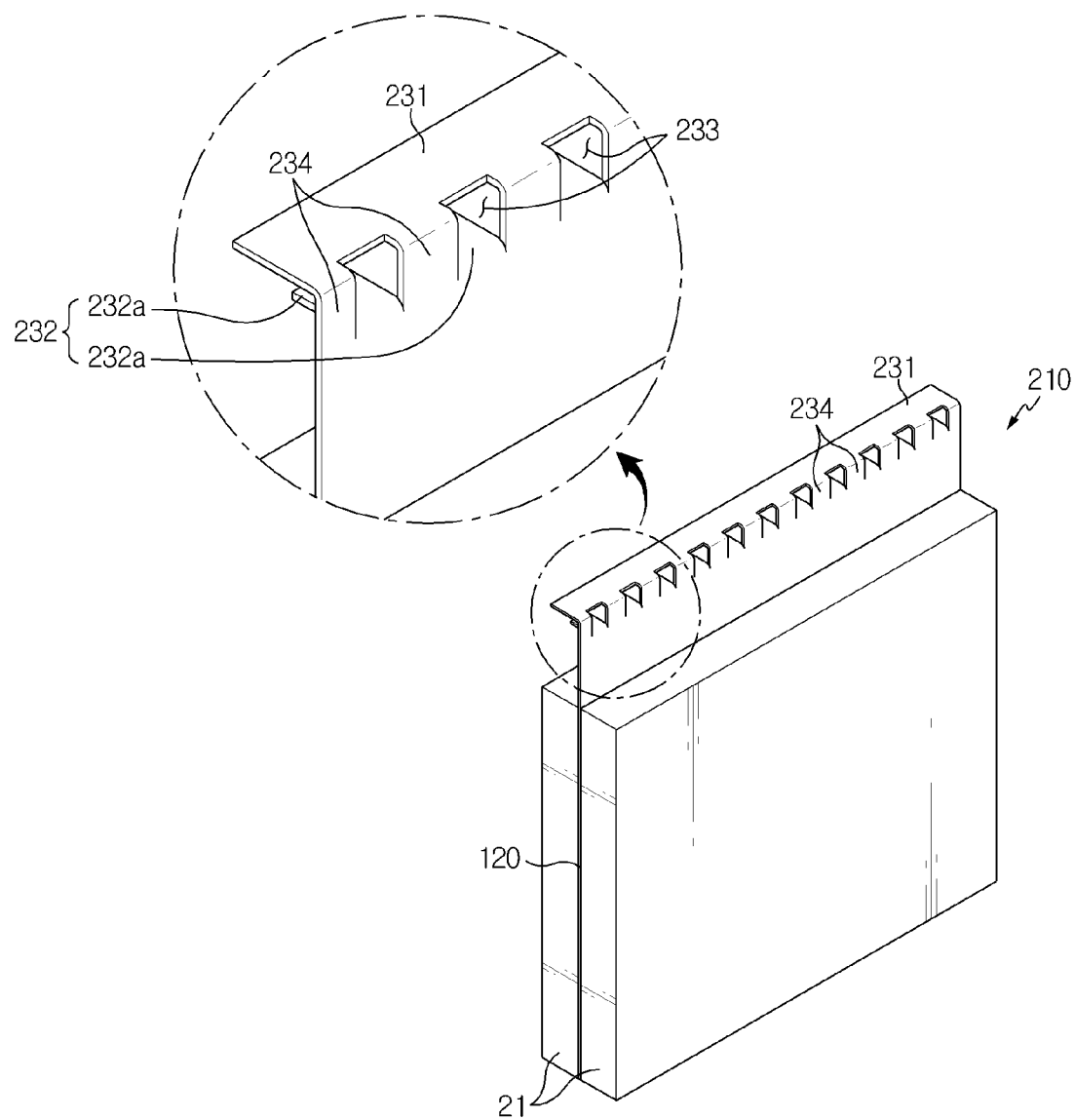
FIG. 7 is a perspective view showing some of battery cells and cooling plates of FIG. 6.

FIG. 6 is a schematic perspective view of a battery module according to a second embodiment of the present disclosure, and FIG. 7 is a perspective view showing some of battery cells and cooling plates of FIG. 6.

This embodiment is designed the same as the embodiment of FIGS. 2 through 5, only different in the second bent surface when compared to the previous embodiment, and a difference between this embodiment and the previous embodiment is primarily described below.

As shown in FIGS. 6 and 7, a second bent surface 232 according to the second embodiment of the present disclosure includes a plurality of unit second bent surfaces 232a.

The plurality of unit second bent surfaces 232a may be formed at a predetermined interval along the widthwise direction of the cooling plate 210. In other words, although the second bent surface 132 is integrally formed in the first embodiment, the second bent surface 232 may be divided into a plurality of parts in this embodiment.

According to this embodiment, vertical surfaces 234 are present between the unit second bent surfaces 232a, so a heat emitting part 230 has higher mechanical rigidity than the first embodiment. That is, because a first bent surface 231 is supported by the plurality of vertical surfaces 234, the bent shape can be maintained more stably.

Also, as compared to the first embodiment, a turbulence flow around through-holes 233 increases, enhancing the heat exchange through cool air.

Figure 8:
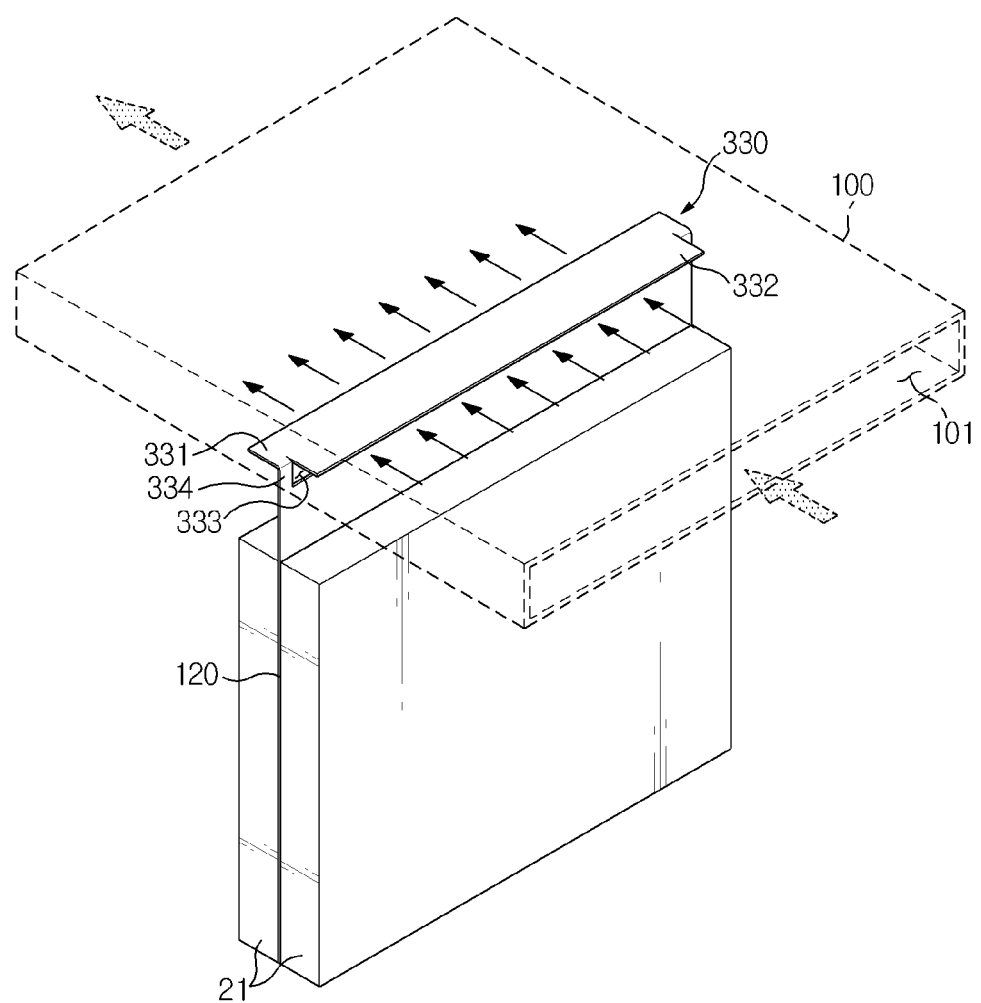
FIG. 8 is a perspective view showing a part of battery module according to a third embodiment of the present disclosure.
Figure 9:
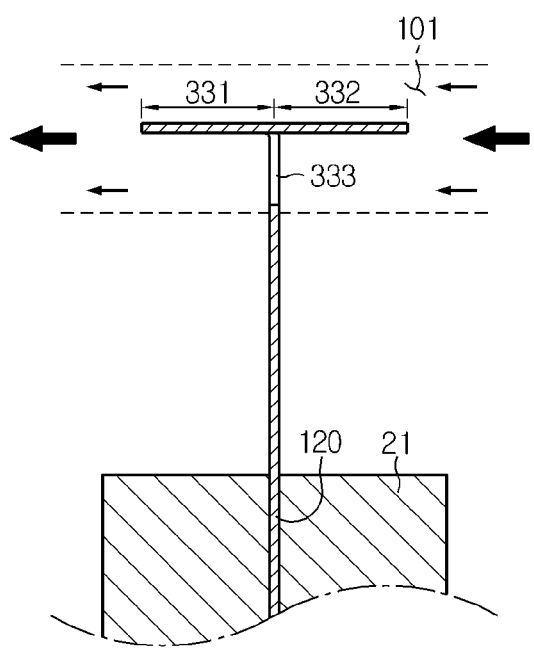
FIG. 9 is a cross-sectional view of FIG. 8.
Figure 10:
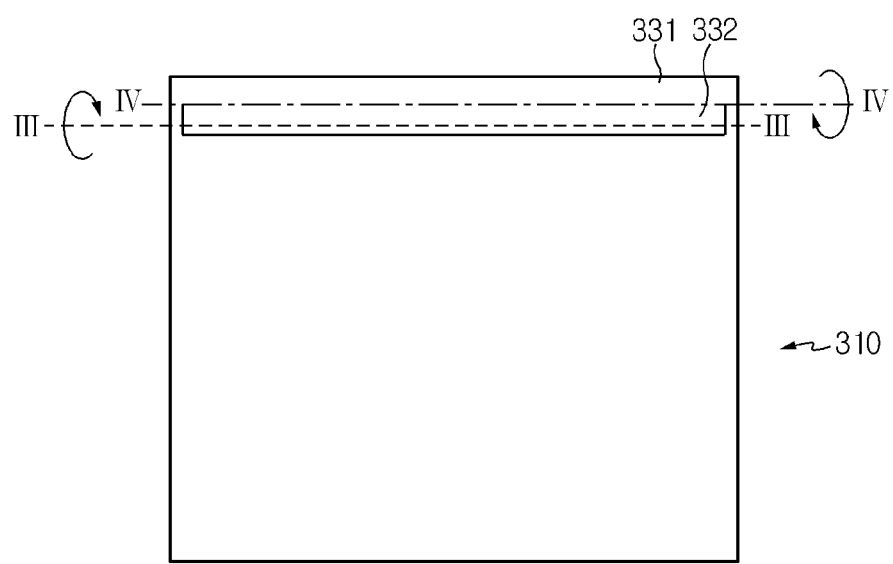
FIG. 10 is a reference diagram for a cooling plate according to a third embodiment of the present disclosure.

FIG. 8 is a perspective view showing a part of battery module according to a third embodiment of the present disclosure, FIG. 9 is a cross-sectional view of FIG. 8, and FIG. 10 is a reference diagram for a cooling plate according to the third embodiment of the present disclosure.

Bent surfaces 331 and 332 of the cooling plate 310 according to the third embodiment of the present disclosure are formed such that the end part of the cooling plate 310 is bent in the shape of roughly letter "T".

A heat emitting part 330 of the cooling plate 310 according to this embodiment may be formed by a similar method to the above described embodiment, but the second bent surface 332 has a bent shape in the opposite direction to the first bent surface 331 so that the first bent surface 331 and the second bent surface 332 are provided on the same plane. More specifically describing, as shown in FIG. 10, an end part of the flat cooling plate 310 is bent back at an angle of 90 degrees with respect to the line to form the first bent surface 331, and the cut part is bent forward at an angle of 90 degrees with respect to the line IV-IV to form the second bent surface 332. Similar to the above described embodiments, a space formed by bending the cut part becomes a through-hole 333, and the size of the through-hole 333 is equal to the cross sectional area of the second bent surface 332. However, dissimilar to the above described embodiments, the first bent surface 331 and the second bent surface 332 of this embodiment are disposed on the same plane as shown in FIGS. 8 and 9. Of course, the heat emitting part 330 of the cooling plate 310 is not limited to a method such as the above described method. In other words, the bent surfaces may be integrally formed by bending the end part of the cooling plate 310 in the shape of "T" and the through-hole 333 may be formed by perforating a vertical surface 334 very below the bent surfaces 331 and 332.

According to the third embodiment of the present disclosure, as shown in FIG. 9, cool air flows along the upper and lower surfaces of the first bent surface 331 and the second bent surface 332, leading to a wider effective heat emission area. In the case of the above described embodiments (see FIG. 4), because the second bent surfaces 132 and 232 are disposed below the through-holes 133 and 233, the flow of cool air along the lower surface of the second bent surface may not be smooth. In contrast, because the second bent surface 332 is formed below the through-hole 333 in this embodiment, the flow of cool air along the lower surface of the second bent surface 132 may be smooth.

The heat emitting part 330 according to this embodiment has the same overall cross sectional area and a wider effective heat emission area when compared to the heat emitting parts 130 and 230 of the above described embodiments. Thus, the cooling efficiency of the battery module can be increased.

Figure 11:
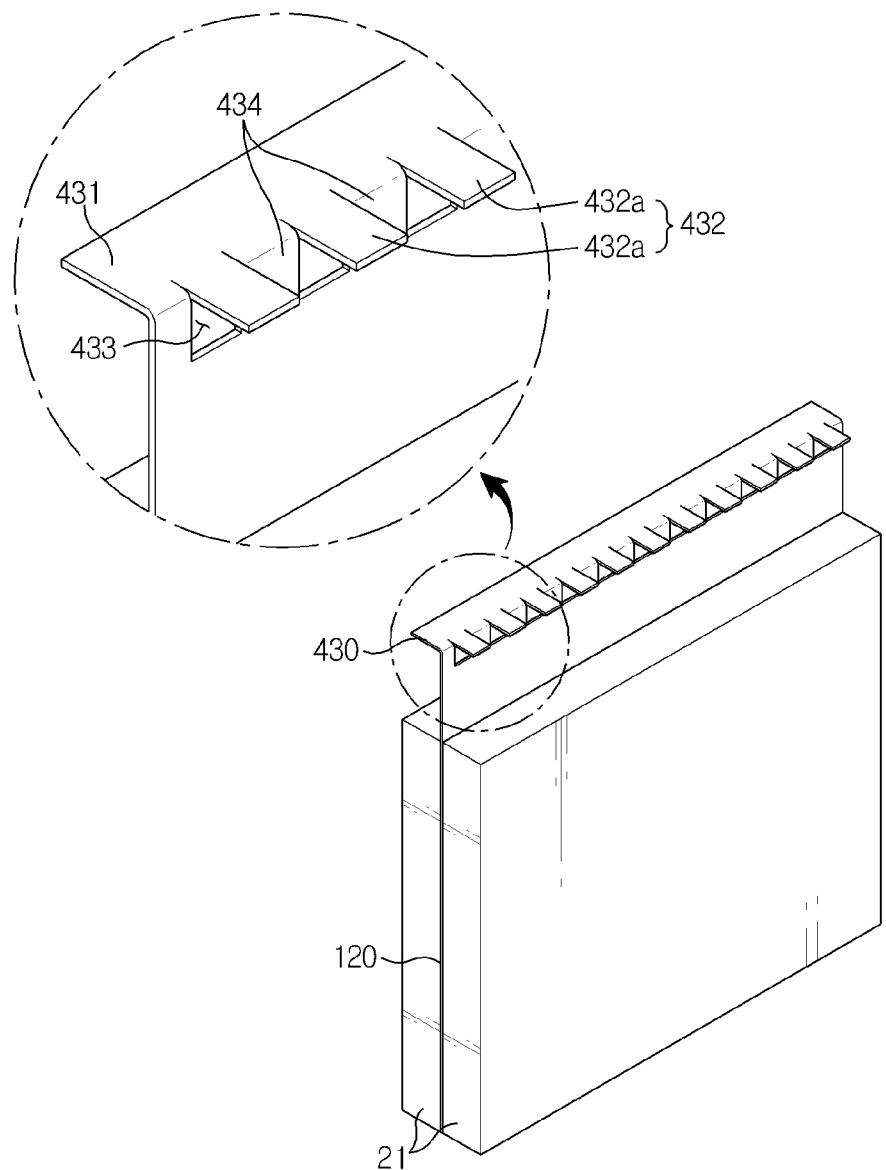
FIG. 11 is a perspective view showing a part of battery module according to a fourth embodiment of the present disclosure.

FIG. 11 is a perspective view showing a part of a battery module according to a fourth embodiment of the present disclosure.

Although this embodiment has fundamentally a similar structure to the above described third embodiment, a second bent surface of this embodiment is formed such that the second bent surface 332 is divided into a plurality of branches. That is, as shown in FIG. 11, the second bent surface 432 according to the fourth embodiment of the present disclosure may include a plurality of unit second bent surfaces 432a.

According to this embodiment, similar to the above described second embodiment, because vertical surfaces 434 are present between the unit second bent surfaces 432a, the mechanical rigidity of a heat emitting part 430 may be higher than the first and third embodiments. Accordingly, because first and second bent surfaces 431 and 432 are supported by the plurality of vertical surfaces 434, the bent shape can be maintained more stably. Also, as compared to the third embodiment, a turbulence flow around a plurality of through-holes 433 increases, enhancing the heat exchange through cool air.

The battery pack according to the present disclosure may include at least one above described battery module 10 according to the present disclosure. In addition to the battery module, the battery pack may further include a case for covering the battery module and a variety of devices for controlling the discharge and discharge of the battery module, for example, a BMS, a current sensor, and a fuse.

The battery pack according to the present disclosure may be used for vehicles such as electric vehicles or hybrid vehicles. That is, the vehicles according to the present disclosure may include the battery module according to the present disclosure.

Although the preferred embodiments of the present disclosure have been hereinabove shown and described, the present disclosure is not limited to the particular preferred embodiments described in the foregoing, and it will become apparent to those skilled in the art that various changes and modifications may be made without departing from the essential features of the present disclosure to which the claims are entitled, and such changes and modifications fall within the scope of the claims.

On the other hand, it is obvious to those skilled in the art that the terms used to indicate the direction as described herein, such as 'upper', 'lower', 'right' and 'left', are only for convenience of description, and may be differently expressed depending on a viewing position of a viewer or a location where an object is placed.

What is claimed is:

1. A cooling device for battery cells comprising:
a heat sink with a hollow structure disposed adjacent to at least one side of a battery cell assembly and having a channel formed therein through which a coolant flows, the battery cell assembly comprising a plurality of battery cells; and
a cooling plate configured to carry out heat exchange with the battery cells, the cooling plate comprising a heat absorbing part interposed between the battery cells such that one surface or both surfaces come into contact with the battery cells, and a heat emitting part extending from the heat absorbing part and exposed to the channel, wherein the heat emitting part comprises plural bent surfaces with at least one bent surface arranged parallel to the channel, wherein the bent surfaces are arranged apart from each other at a predetermined interval with through-holes placed therebetween, and at least one through-hole through which the coolant goes.

2. The cooling device for battery cells according to claim 1, wherein the plurality of bent surfaces comprises:
   a first bent surface formed such that an end part of the cooling plate is bent; and
   a second bent surface formed in a bent shape parallel to the first bent surface below the first bent surface.

3. The cooling device for battery cells according to claim 2, wherein the second bent surface is formed such that the cooling plate is partially cut and the cut part is bent parallel to the first bent surface, and
   the through-hole is defined as a space formed by bending the cut part.

4. The cooling device for battery cells according to claim 3, wherein the second bent surface comprises a plurality of unit second bent surfaces, and the unit second bent surfaces are formed at a predetermined interval along a widthwise direction of the cooling plate.

5. The cooling device for battery cells according to claim 1, wherein the plural bent surfaces comprise:
   a first bent surface formed such that an end part of the cooling plate is bent in one direction; and
   a second bent surface formed such that the cooling plate is partially cut and the cut part is bent in an opposite direction to the first bent surface and parallel to the first bent surface.

6. The cooling device for battery cells according to claim 5, wherein the first bent surface and the second bent surface are provided on the same plane, and the through-hole is defined as a space formed by bending the cut part.

7. The cooling device for battery cells according to claim 6, wherein the second bent surface comprises a plurality of unit second bent surfaces, and the unit second bent surfaces are formed at a predetermined interval along a widthwise direction of the cooling plate.

8. The cooling device for battery cells according to claim 1, wherein the cooling plate is a thermally conductive metal plate.

9. The cooling device for battery cells according to claim 1, wherein the coolant is a gas or a liquid.

10. A battery module comprising:
    the cooling device for battery cells according to claim 1.

11. A battery pack comprising:
    the battery module according to claim 10.

12. A vehicle comprising:
    the battery pack according to claim 11.

* * * * *